A. H. Rennie,
Shears.
N.º 73,836. Patented Jan. 28, 1868.
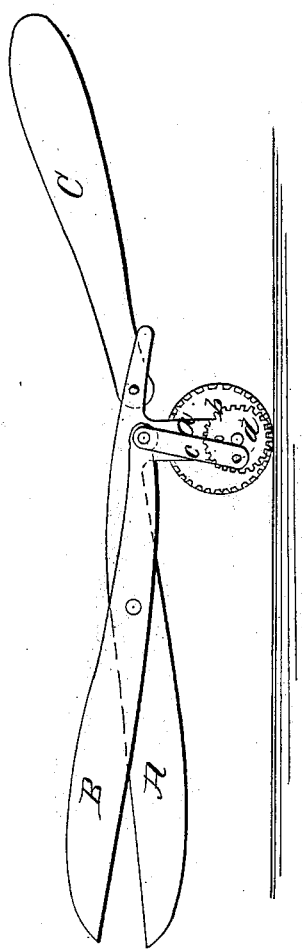
Witnesses.
Theo Fiscke
Wm Treurn
Inventor.
A H Rennie
Per Munn
Attorneys

United States Patent Office.

A. H. RENNIE, OF BINGHAMTON, NEW YORK.

Letters Patent No. 73,836, dated January 28, 1868.

IMPROVEMENT IN SCISSORS.

The Schedule referred to in these Letters Patent and making part of the same.

TO ALL WHOM IT MAY CONCERN:

Be it known that I, A. H. RENNIE, of Binghamton, in the county of Broome, and State of New York, have invented a new and useful Improvement in Shears; and I do hereby declare that the following is a full, clear, and exact description thereof, which will enable others skilled in the art to make and use the same, reference being had to the accompanying drawings, forming part of this specification.

The object of this invention is to construct scissors or shears in such a manner that the blades will be self-moving, not requiring to be operated by the hands.

The invention consists of one or more wheels, attached to one of the blades, and connected with the other blade by crank-motion, so that when the handle of the immovable blade is grasped, and the wheel or wheels are placed on the counter, and the shears then moved forward in any desired direction, the other blade will be set in motion by the revolution of the wheel or wheels, and will cut cloth or paper as quick as the device is moved forward.

This machine will prove of special value for tailors and in dry-goods establishments, and also for trimming paper-hangings, but it may be used with advantage for all the purposes for which shears or scissors are now used.

In the annexed drawing, which represents a side view of my improved shears, my invention is illustrated.

A represents the fixed blade, on which one or more arms, $a$, are arranged, to each of which a wheel, $b$, is secured, which will revolve freely, when the device is set on a table, in the manner shown in the drawing. To the wheel $b$ is either directly secured a crank, $c$, or the wheel $b$ is provided with internal gear, as shown, and a pinion, $d$, is revolved by the internal gear, the said pinion being also hung on the arm $a$. The crank $c$ is then secured eccentrically on the pinion $d$, as shown, and its upper end is connected with the shank of the cutting-blade B.

A handle, C, is arranged on the shank of blade A, and by it the device is handled. It is obvious that, by moving it forward, the wheel $b$ being on the table or counter, the blade B will receive oscillating motion, and will cut as fast as the device is moved along.

For better adhesion, and also for protecting the surface on which the wheel runs, the circumference of the latter may be lined with rubber, if desired.

Having thus described my invention, I claim as new, and desire to secure by Letters Patent, as a new article of manufacture—

The combination of the blades A B, handle C, arms $a$, wheel $b$, crank $c$, and pinion $d$, substantially as described, for the purpose specified.

A. H. RENNIE.

Witnesses:
 A. H. ALLARD,
 THOS. OWEN.